Patented Aug. 5, 1952

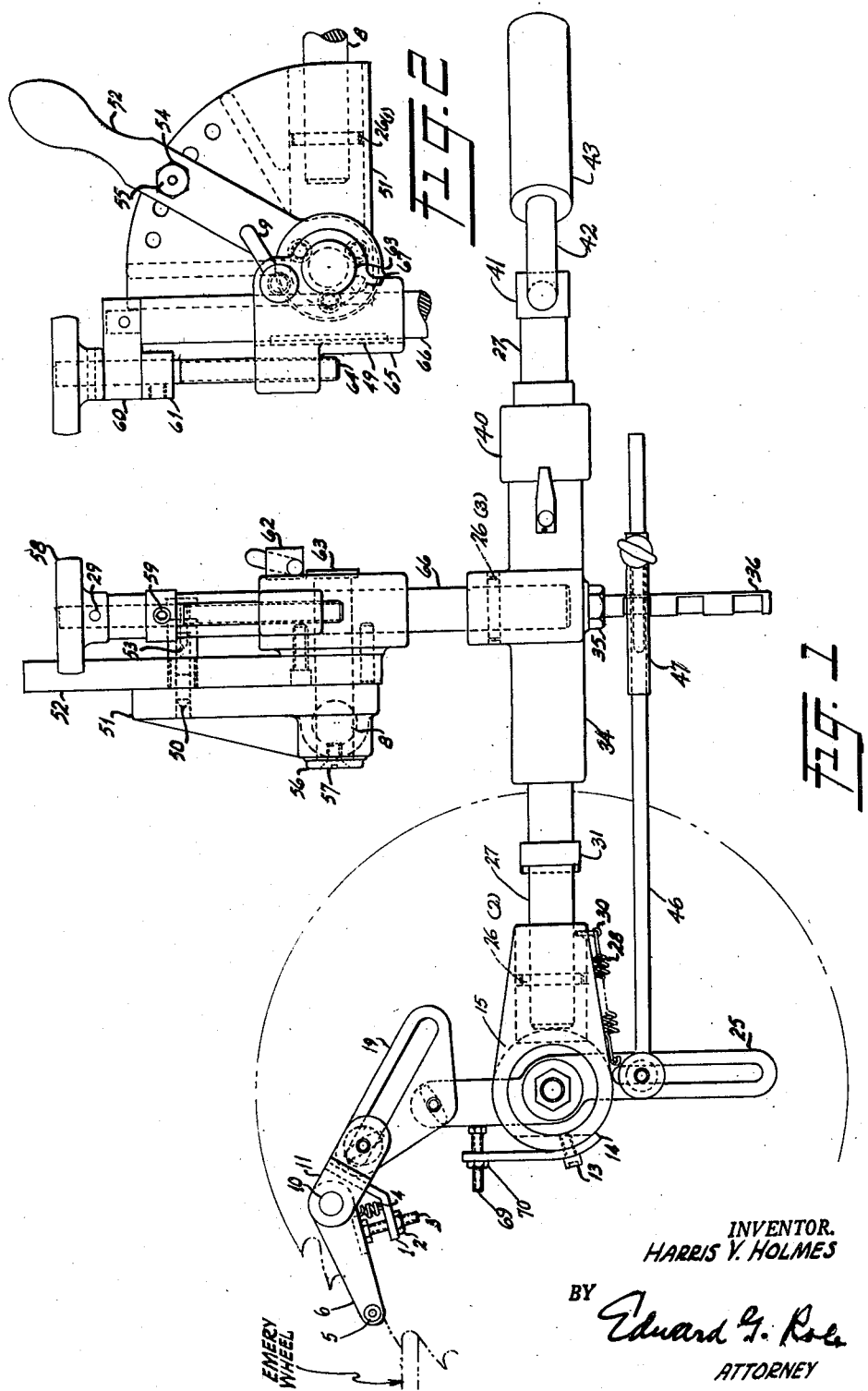

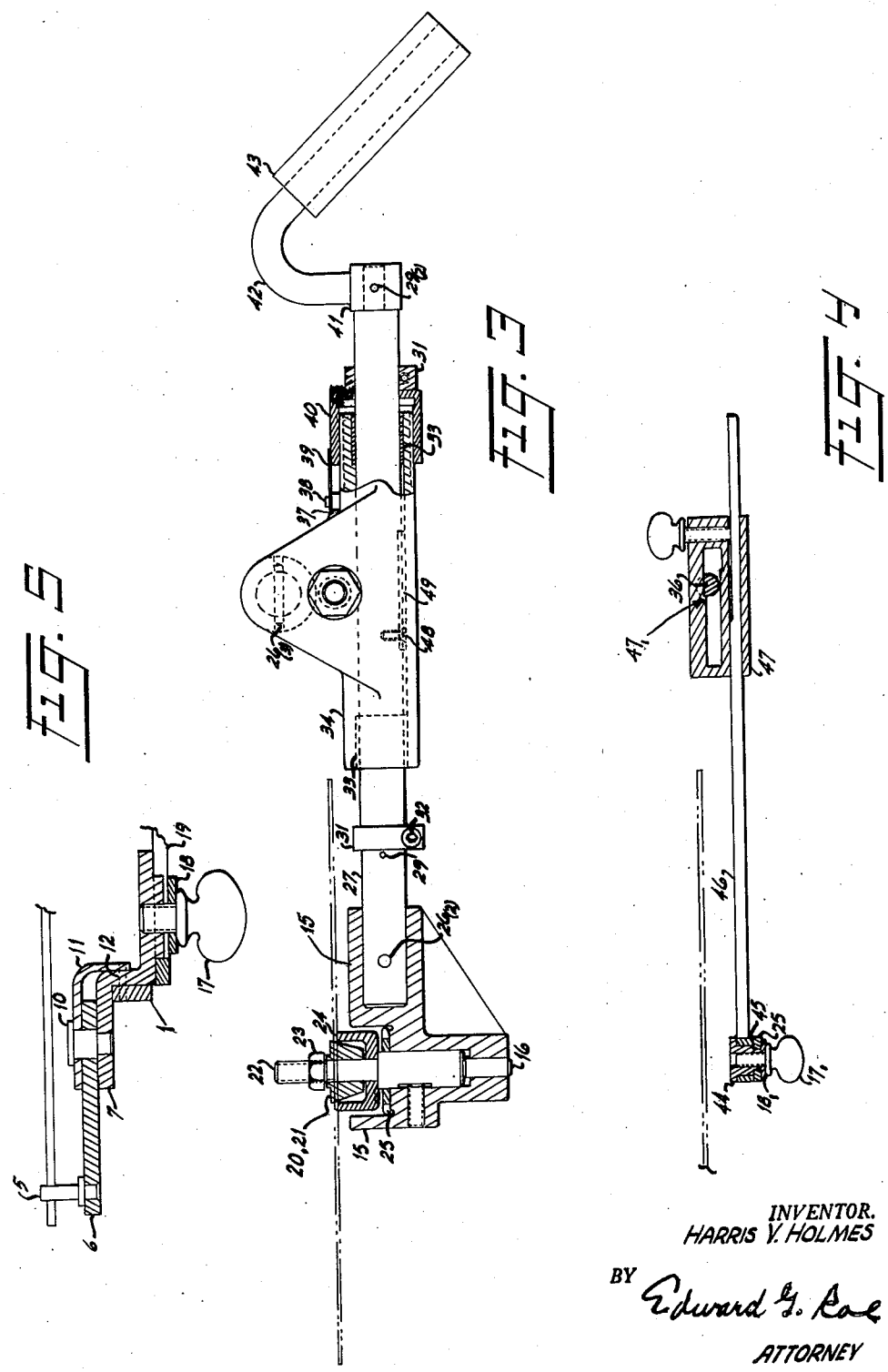

2,605,654

UNITED STATES PATENT OFFICE 2,605,654

SAW GUMMING AND SHARPENING MACHINE

Harris V. Holmes, Marathon, N. Y.

Application January 4, 1951, Serial No. 204,347

5 Claims. (Cl. 76—77)

The invention relates to a machine for gumming and sharpening circular saws.

Gumming and sharpening a circular saw has been heretofore a difficult task, wherein gumming, that is grinding out the gullet of the teeth, is done in one operation, then sharpening the front (as opposed to the gullet) is accomplished in another operation. Then, too, the bevels on the front and back of the teeth, and the "set" of the teeth make gumming and sharpening a job for only the most skilled artisan, and it has usually been done manually. Some automatic devices have been employed, but these have not been used generally, as their range of adjustment, accuracy and ease of operation have not measured up to the requirements of the work, and furthermore, the cost of their manufacture has precluded their general use.

I have, after long experimentation, devised a machine, for use with an emery or other suitable abrasive wheel, which will gum and sharpen circular saws, affording the maximum range of adjustment, can be operated with ease and certainty of control, and can be manufactured at comparatively low cost.

It is an object of the invention to provide a machine which will enable anyone familiar with handling tools to gum and sharpen circular saws to a nicety, a task which heretofore has been entrusted to skilled artisans only.

It is another object to provide a machine which, in conjunction with an emery wheel will do a speedy, accurate gumming and sharpening job on circular saws, presenting the teeth for sharpening in a predetermined sequential manner.

A still further object comprehends the provision of a machine for employment in gumming and sharpening saws which affords the maximum in adjustment, both for accommodating saws of different dimensions and to gum and sharpen varied sizes and types of teeth.

A further object is to provide a machine which can be expeditiously operated and which may be manufactured at a minimum of cost, to place it within the pocketbook and means of the small shop, the carpenter and the home craftsman.

Other objects will be apparent after a description of the invention unfolds.

Briefly described, the machine for gumming and sharpening saws includes an adjustable, supporting frame for the saw blade wherein the blade is adapted to be mounted for rotation on the frame and move in a predetermined path or paths with relation to an abrasive or grinding wheel, and means are provided for maximum adjustment of the saw for gumming and sharpening, including means to tilt the saw to obtain beveling of the teeth.

In the drawings:

Fig. 1 is a top plan view of a preferred form of the gumming and sharpening machine embodying my invention.

Fig. 2 is a sub-assembly of the tilt and lateral assembly device.

Fig. 3 is a side view with saw mounting and part of shaft housing in section.

Fig. 4 is a section of one of the elements of the machine.

Fig. 5 is a section showing the assembly of the finger and finger arm support.

For purposes of explanation, the separately numbered parts are summarized below, at the outset:

1, bracket
2, hex nut
3, hex head cap screw
4, extension spring
5, finger
6, finger arm
7, finger arm support
8, standard
9, handle
10, pivot pin
11, pivot pin support
12, rivet
13, socket cap screw
14, bracket
15, head
16, socket set screw
17, finger screw
18, flat washer
19, plate
20, cone "A"
21, cone "B"
22, spindle
23, hex nut
24, cup
25, arm
26, taper pin
27, shaft
28, extension spring
29, dowel
30, screw eye
31, collar
32, socket cap screw
33, bushing
34, shaft housing
35, gland nut
36, extension
37, pin
38, socket cap screw
39, flat spring
40, fine adjustment collar
41, hub
42, handle
43, handle grip
44, pivot
45, hub
46, shaft
47, stop block
48, flat head machine screw
49, feather key
50, index pin
51, index plate
52, index handle
53, compression spring
54, index pin retainer
55, knob
56, special washer
57, flat head machine screw
58, knob
59, socket set screw
60, thrust block
61, collar
62, clamp screw
63, stub shaft
64, adjustment screw
65, housing
66, shaft
67, dowel
68, socket cap screw
69, hex head cap screw
70, hex nut The machine is supported on standard 8, which is received in index plate 51 and connected thereto by taper pin 26, as best shown in Fig. 2. As depicted in Figs. 1 and 2, the sub-assembly which provides for lateral and tilting adjustment of the machine comprises the aforesaid index plate 51 which includes recesses for receiving index pin 50 having compression spring 53 attached to index pin retainer 54 and knob 55, all assembled in index handle 52. This latter member is pivoted on stub shaft 63 and fixedly secured to housing 65 which is also pivoted on said stub shaft. The stub shaft extends through index plate 51, has one end enlarged, and is held in assembled relationship by washer 56 and flat head machine screw 57.

Housing 65 is bored therethrough and slidably received in the bore is shaft 66, one end of which carries thrust block 60. Through main upper extension of housing 65 is threaded adjustment screw 64, which extends in parallelism with shaft 66, has knob 58 pinned at the end adjacent to thrust block 60 and can be locked against displacement by collar 61 and socket set screw 59. Thrust block 60 is pinned to and integral with shaft 66 and is entirely separate from collar 61, the latter being held to shaft 64 by set screw 59. Clamp screw 62 threaded into housing 65 is provided to hold shaft 66 in desired position within said housing. Loosening the set screw 59 and manipulation of knob 58 permits of lateral adjustment of shaft 66, the opposite end of which is anchored in shaft housing 34 by taper pin 26 (3) —see Fig. 3.

Tilting adjustment is effected by loosening clamp screw 62 by movement of handle 9, manipulating handle 52 to the desired point and setting index pin in the appropriate recess.

Shaft 27 extends through the shaft housing, at one end of which is mounted a handle 42 having hub 41 attached to the shaft as by dowel 29 (2). Forwardly of the handle and also disposed on the shaft on the opposite sides of shaft housing 34 are collars 31, each having socket cap screws 32, which can be adjusted so as to act as stops for the forward and rearward movement of shaft 27.

Positioned forwardly of the rearmost of collars 31, and on shaft housing 34 is fine adjustment collar 40, adapted to be held in desired position by flat spring 39 which is attached to the housing as by pin 37 and cap screw 38.

Head 15 is rigidly affixed to shaft 27 by taper pin 26 (2) and receives vertically disposed spindle 22, having socket set screw 16 at its lower end and at its upper portion is mounted cup 24 which hold a pair of cones 20, 21, the one beneath and above the saw blade holding it firmly therebetween when hex nut 23 is tightened.

Arm 25 is pivoted eccentrically on spindle 22 beneath cup 24 and extends laterally oppositely and outwardly from head 15, and has one outer extension slotted to receive the forward end of shaft 46. The opposite end of the arm 25 has pivoted thereon slotted plate 19, the slot provided for adjustment to compensate for saws with varying diameters. The lower portion of offset finger arm support 7 is adjustably supported in the slot of plate 19 and adapted to be locked in any desired position by finger screw 17, with flat washer 18 between said screw and the bottom of the plate.

Pivot pin support 11 is riveted as by rivet 12 to finger arm support 7, to allow more contact surface for finger arm 6 and keep it from sagging. This latter member pivots on pivot pin 10 carried by support 7 and at its outer end is mounted finger 5, as best shown in Fig. 5.

Hook shaped bracket 14 is fastened to head 15 and carries hex nut 70 and adjusting screw 69 which acts as a stop for the forward movement of arm 25, while extension spring 28 attached to screw eye 30 and to the arm holds the arm against bracket 14.

Extending laterally from shaft housing 34 is extension 36 attached to the housing as by gland nut 35. This extension is transversely slotted and the slots are adapted to receive stop block 47.

The forward end of shaft 46 has hub 45 which pivots on pivot 44 which is supported and pivots on arm 25, member 44 serving both as a nut and a pivot pin, with finger screw 17 and flat washer 18 provided.

Adjustment from one notch to another on extension 36 is accomplished by shoving stop block 47 to wide opening and shifting to the desired notch.

Bracket 1, not hereinbefore referred to, is riveted to finger arm support 7 and carries hex nut cap screw 3 and hex nut 2. As stated before, finger arm 6 can be adjusted in the slot of plate 19 to accommodate saws with diameters of from 6" to 10". After adjustment to fit the saw, member 3 is adjusted to bring the front of the tooth to be gummed in line with the side of the abrasive wheel. Then the screw 69 in bracket 14 is adjusted so that finger 5 is about 1/16 of an inch from the bottom of the gullet.

With the left hand holding the saw blade in position, grasp the handle 42 with the right hand and move forwardly until the tooth is ground to the desired depth. Then bring collar 31 up to the confronting end of shaft housing 34 and fasten, thus assuring that with each stroke of shaft 27 forwardly, the depths of the gullets will be uniform.

Next, adjust the screw of block 47 on shaft 46 to bring said shaft to the position shown in Fig. 1.

Following adjustment of block 47, shaft 27 is manually moved rearwardly until the saw is clear of the abrasive wheel. With shoulder 47' of block 47 impinging against shaft 36, shaft 46 will not travel back in parallelism with shaft 27 causing arm 25 to pivot at pivot 22, thus revolving the saw clockwise by finger 5, guiding the back of the tooth to the proper curve, by controlled movement past the abrasive wheel.

The length of saw teeth produced is governed by the position of pivot 44 in the slot of arm 25, which is adjustable inwardly and outwardly of pivot 22. The closer pivot 44 is to pivot 22 the shorter the teeth. The more distance between pivot 44 and pivot 22, the longer the saw teeth.

Next, with the left hand disengage shoulder 47' of stop block 47 from extension 36 and spring 28 will return arm 25 and the cooperating assembly to proper position for grinding the next tooth; revolve the saw blade manually counter-clockwise until the next tooth is engaged by finger 5 and repeat operation of movement of shaft 27 inward and outward of the emery wheel.

In order to grind a bevel to the front and back of teeth, handle 52 should be raised or lowered until index pin 50 engages the selected recess of index plate 51. Since handle 52, as hereinbefore explained, extends oppositely to and is joined integrally with housing 65 which encases shaft 66, shaft 66 carrying shaft housing 34 is caused to tilt with shaft 63 as the pivotal point. With the adjustment for guiding the proper bevel achieved through positioning of the handle 52, the saw may be manipulated by grasping handle 42 moving toward the emery wheel, grinding alternate teeth according to their "set." After alternate teeth are ground handle 52 should be moved to the selected position for achieving the proper bevel to the other "set" of the unground teeth, which may then be ground.

As will be apparent to those skilled in the art, when positioning the gumming and sharpening machine relative to the emery wheel, and as illustrated in Fig. 1—it should be lined up with a line along the center of bearing 63 parallelling the inside of the point of the tooth to be ground and then along the face of the emery wheel to the center thereof.

I reserve the right to make such changes or modification as may come within the scope of the appended claims.

I claim:

1. A circular saw holding and positioning machine for use with a rotating abrasive wheel, in combination, a standard having a longitudinal extension, a housing having an upper and oppositely extending lower lateral extension pivoted on said longitudinal extension, a saw carrying bar, means to carry a saw on said bar, said bar slidably held by the housing and extending in front and rearwardly of the housing, means to limit the forward and rearward movement of said bar, a hook-shaped arm carrying a finger mounted for lateral movement near one outer end of the bar and supported on an arm pivoted to one end of the bar, said finger adapted to engage the saw teeth gullets, a shaft in parallelism with the saw carrying bar and supported adjacent one end by the housing and at its other end by said arm pivoted to one end of the saw carrying bar, means provided on the shaft and on the arm pivoted to one end of the bar to pivot said arm upon sliding movement of said saw carrying bar to index successive saw tooth gullets.

2. A circular saw holding and positioning machine as described in claim 1 wherein a quadrant is affixed to the standard, and means are provided on the upper extension of the housing for adjusting the tilt of the housing whereby teeth of the saw may be bevel sharpened according to predetermined adjustment of said means.

3. A circular saw holding and positioning machine as described in claim 1 wherein a quadrant carrying notches and calibrations is affixed to the standard and a lever carrying a detent is mounted on a part of the housing oppositely disposed to the saw carrying bar to adjustably tilt the bar to achieve a predetermined bevel sharpening of the teeth of the saw.

4. A circular saw holding and positioning machine as described in claim 1 wherein an arbor is mounted at one end of the saw carrying bar for holding the saw, and the arm supporting the hook shaped finger carrying arm is pivoted on the same arbor.

5. A circular saw holding and positioning machine as described in claim 1 wherein the saw is mounted on the same center as the arm which supports the hook shaped arm carrying the finger which engages the saw tooth gullets, so that saw tooth gullets may be gummed and saw teeth sharpened sequentially.

HARRIS V. HOLMES.

REFERENCES CITED

The following references are of record in the file of this patent:

UNITED STATES PATENTS

| Number | Name | Date |
|---|---|---|
| 298,928 | Willey | May 20, 1884 |
| 385,693 | Blackmer | July 10, 1888 |
| 928,332 | Robinson | July 20, 1909 |
| 2,353,956 | Enholm | July 18, 1944 |

FOREIGN PATENTS

| Number | Country | Date |
|---|---|---|
| 928,403 | France | June 2, 1947 |
| 258,916 | Switzerland | Dec. 1, 1949 |